(12) United States Patent
Bykova et al.

(10) Patent No.: US 11,486,063 B2
(45) Date of Patent: Nov. 1, 2022

(54) INSULATED NANOFIBER YARNS

(71) Applicant: Lintec of America, Inc., Richardson, TX (US)

(72) Inventors: Julia Bykova, Richardson, TX (US); Marcio D. Lima, Richardson, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 358 days.

(21) Appl. No.: 16/103,102

(22) Filed: Aug. 14, 2018

(65) Prior Publication Data

US 2019/0062958 A1 Feb. 28, 2019

Related U.S. Application Data

(60) Provisional application No. 62/550,761, filed on Aug. 28, 2017.

(51) Int. Cl.
*D02G 3/04* (2006.01)
*D02G 3/44* (2006.01)
(Continued)

(52) U.S. Cl.
CPC ........... *D02G 3/441* (2013.01); *C01B 32/158* (2017.08); *D02G 3/04* (2013.01); *D02G 3/36* (2013.01); *D02G 3/404* (2013.01); *C01B 2202/08* (2013.01); *C01B 2202/22* (2013.01); *D10B 2101/122* (2013.01); *D10B 2321/021* (2013.01);
(Continued)

(58) Field of Classification Search
CPC ............ D02G 3/441; D02G 3/04; D02G 3/36; D02G 3/404; C01B 32/158; C01B 2202/08; C01B 2202/22; D10B 2101/122; D10B 2321/021; D10B 2321/022; D10B 2331/02; D10B 2401/16; D10B 2401/18;
(Continued)

(56) References Cited

U.S. PATENT DOCUMENTS 8,847,074 B2 9/2014 Mann et al.
2009/0196982 A1* 8/2009 Jiang ................. H01B 13/0162
427/113
(Continued)

FOREIGN PATENT DOCUMENTS

CN 101845680 9/2010
CN 105133293 12/2015
(Continued)

OTHER PUBLICATIONS

Alvarez, "Polymer Coating of Carbon Nanotube Fibers for Electric Microcables," Nanomaterials, 2014, pp. 879-893. (Year: 2014).*
(Continued)

*Primary Examiner* — Matthew D Matzek
(74) *Attorney, Agent, or Firm* — Greenblum & Bernstein, P.L.C.

(57) ABSTRACT

An insulated nanofiber having a continuous nanofiber collection extending along a longitudinal axis with an outside surface and an inside portion is described. A first material infiltrates the inside portion, where the outside surface of the nanofiber collection is substantially free of the first material. An electrically-insulating second material coats the outside surface of the nanofiber collection. A method of making an insulated nanofiber collection is also disclosed.

6 Claims, 6 Drawing Sheets

(51) Int. Cl.
   *C01B 32/158* (2017.01)
   *D02G 3/36* (2006.01)
   *D02G 3/40* (2006.01)

(52) U.S. Cl.
   CPC .... *D10B 2321/022* (2013.01); *D10B 2331/02* (2013.01); *D10B 2401/16* (2013.01); *D10B 2401/18* (2013.01)

(58) Field of Classification Search
   CPC ......... B82Y 30/00–40/00; H01B 13/06; H01B 13/067; H01B 7/00; H01B 7/0009
   USPC ....... 977/742, 750, 752, 762, 753, 775, 783, 977/784; 428/364, 367, 368; 174/110 R, 174/113 C, 120 R, 120 C, 120 AR, 174/120 SR
   See application file for complete search history.

(56) References Cited

U.S. PATENT DOCUMENTS

| | | |
|---|---|---|
| 2013/0240241 A1 | 9/2013 | Dubrow et al. |
| 2014/0231118 A1 | 8/2014 | Koziol et al. |
| 2014/0318857 A1* | 10/2014 | Sun .......... D06B 3/04 174/70 R |
| 2015/0129276 A1 | 5/2015 | Shumaker et al. |
| 2015/0167205 A1 | 6/2015 | Cooper |
| 2016/0141773 A1 | 5/2016 | Emrys |
| 2016/0200047 A1* | 7/2016 | Mark ............ B29C 70/20 264/148 |

FOREIGN PATENT DOCUMENTS

| | | |
|---|---|---|
| JP | 59-129259 | 7/1984 |
| JP | 2007-231089 | 9/2007 |
| JP | 2009-187944 | 8/2009 |
| JP | 2014070322 | 4/2014 |
| JP | 2016-122644 | 7/2016 |
| JP | 2020-531700 | 11/2020 |
| WO | 2001/092381 | 12/2001 |
| WO | 2007/015710 | 2/2007 |
| WO | 2016/004457 | 1/2016 |
| WO | 2016/021672 | 2/2016 |
| WO | 2017/018558 | 2/2017 |

OTHER PUBLICATIONS

Agnieszka Lekawa-Raus et al., "Towards the development of carbon nanotube based wires", Carbon, vol. 68, Mar. 2014, Elsevier Ltd., pp. 597-609.

Noe T. Alvarez et al., "Polymer Coating of Carbon Nanotube Fibers for Electric Microcables", Nanomaterials, Dec. 2014, vol. 4, pp. 879-893.

PCT Search Report and Written Opinion for PCT Application No. PCT/US18/46624 filed on Aug. 14, 2018, dated Dec. 31, 2018, 9 pages.

International Preliminary Report on Patentability received for PCT Application No. PCT/US2018/046624, dated Mar. 12, 2020. 8 pages.

Official Action in Japanese Application No. 2020-511769 dated Jun. 1, 2021, along with English translation thereof.

* cited by examiner

FIG. 6

INSULATED NANOFIBER YARNS

RELATED APPLICATIONS

This application claims priority under 35 USC § 119(e) to U.S. Provisional Patent Application No. 62/550,761, filed on Aug. 28, 2017, which is incorporated by reference herein in its entirety.

TECHNICAL FIELD

The present disclosure relates generally to conductive nanofiber yarns and more specifically to insulated conductive nanofiber yarns.

BACKGROUND

Carbon nanofiber forests, whether composed of single wall nanotubes, multiwall nanotubes, or both can be drawn and spun into highly conductive carbon nanotube (CNT) fibers. In its pre-drawn state, a CNT forest has a single layer of parallel nanofibers that extend perpendicularly from the surface of a growth substrate. When drawn into a nanofiber sheet, the orientation of each nanofiber changes to extend parallel to the surface of the growth substrate, where the nanotubes in the drawn nanofiber sheet connect to one another in an end-to-end configuration to form a continuous sheet. The aligned nanofibers can be spun into a CNT conducting fiber.

CNT conducting fibers include threads, yarns, and ropes made of highly conductive carbon nanotubes. Due to their unique physical properties, of high strength, low density, and high electrical conductivity, CNT conducting fibers have shown promise as candidates to replace traditional copper and aluminum wires in electrical wiring applications.

SUMMARY

Example 1 is a method of making an insulated nanofiber conductor comprising providing a nanofiber collection extending along a yarn axis and having an outside surface and an inside portion; applying first material is to the nanofiber yarn; allowing the first material to infiltrate the inside portion of the nanofiber collection; and removing the first material from the outside surface of the nanofiber collection, thereby producing an infiltrated nanofiber collection with the first material infiltrated into the inside portion and substantially lacking the first material on the outside surface of the nanofiber collection.

Example 2 includes the subject matter of Example 1, further comprising coating the infiltrated nanofiber collection with a second material compositionally different from the first material.

Example 3 includes the subject matter of Example 1 or Example 2, wherein the first material is applied as a molten polymer or a polymer-solvent solution.

Example 4 includes the subject matter of Example 1 or Example 2, wherein removing the first material includes applying a vacuum.

Example 5 includes the subject matter of any of Examples 1-4, wherein removing the first material from the outside surface comprises exposing the outside surface to a moving fluid.

Example 6 includes the subject matter of any of Examples 1-4, wherein the outside surface is subjected to one of a pressurized gas or a solvent stream.

Example 7 includes the subject matter of any of Examples 1-6, wherein providing the nanofiber collection includes selecting the nanofiber collection as a nanofiber yarn having a diameter less than 50 μm.

Example 8 includes the subject matter of any of Examples 1-7, wherein the nanofiber collection is electrically conductive having a resistivity less than $1\times10^{-3}$ Ω-m.

Example 9 includes the subject matter of any of Examples 1-8, further comprising selecting the first material and the second material from the group consisting of acrylonitrile-butadiene-styrene, acrylate-styrene-acrylonitrile, cellulose acetate, PA 6 polyamide 6, polyamide 6,6, a polyamide blend, polybutylene terephthalate, polycarbonate, polycarbonate/acrylonitrile-butadiene-styrene, polycarbonate/polybutylene terephthalate, polycarbonate/polyethylene terephthalate, polyethylene, polyethylene terephthalate, polymethyl methacrylate, polyoxymethylene, polypropylene, polyphenylene oxide, polystyrene, styrene acrylonitrile copolymer, thermoplastic elastomer, thermoplastic polyurethane, and liquid silicone rubber, and wherein the first material and the second material have an adhesion value relative to one another of below $10^5$ Pa.

Example 9A includes the subject matter of any of Examples 1-9, wherein the second material is chemically inert with respect to the first material.

Example 10 includes the subject matter of any of Examples 1-9A, wherein the first material and the second material are selected so that a contact angle of the second material on the first material is at least 90°.

Example 10A includes the subject matter of any of examples 1-9B, wherein the first material and the second material are selected so that a contact angle of the second material on the first material is at least 135°.

Example 11 includes the subject matter of any of Examples 1-10A, wherein the first material is electrically conductive.

Example 12 includes the subject matter of any of Examples 1-11, wherein the first material contains electrically conductive particles.

Example 13 includes the subject matter of any of Examples 1-12, wherein the second material has a resistivity of at least $1\times10^{12}$ Ω-m.

Example 14 is an insulated nanofiber conductor comprising a continuous nanofiber collection extending along a longitudinal axis and having an outside surface and an inside portion; a first material is infiltrated into the inside portion, wherein the outside surface of the nanofiber collection is substantially free of the first material; and a second material coating the outside surface of the nanofiber collection, where the second material is electrically insulating.

Example 15 includes the subject matter of Example 14, wherein the nanofiber collection is electrically conductive.

Example 16 includes the subject matter of either of Example 14 or 15, wherein the nanofiber collection is a carbon nanofiber yarn.

Example 17 includes the subject matter of any of Examples 14-16, wherein, the nanofiber collection has a diameter less than 50 μm.

Example 18 includes the subject matter of any of Examples 14-17, wherein the second material is compositionally different from the first material.

Example 19 includes the subject matter of any of Examples 14-18, wherein one or both of the first material and the second material comprises a polymer selected from the group consisting of acrylonitrile-butadiene-styrene, acrylate-styrene-acrylonitrile, cellulose acetate, PA 6 polyamide 6, polyamide 6,6, a polyamide blend, polybutylene terephthalate, polycarbonate, polycarbonate/acrylonitrile-butadiene-styrene, polycarbonate/polybutylene terephthalate, polycarbonate/polyethylene terephthalate, polyethylene, polyethylene terephthalate, polymethyl methacrylate, polyoxymethylene, polypropylene, polyphenylene oxide, polystyrene, styrene acrylonitrile copolymer, thermoplastic elastomer, thermoplastic polyurethane, or liquid silicone rubber.

Example 20 includes the subject matter of any Examples 14-19, wherein the first material and the second material have an adhesion value relative to one another below $10^5$ Pa.

Example 21 includes the subject matter of any Examples 14-20, wherein the second material has a contact angle of at least 90° when disposed on the first material.

Example 22 includes the subject matter of any Examples 14-21, wherein the first material is electrically conductive.

Example 23 includes the subject matter of any Examples 14-22, further comprising a middle layer disposed on the outside surface between the first material and the second material, where the middle layer comprises a material different from the second material. In examples, the middle layer is a polymer, a volatile lubricant, or a powder.

Example 24 includes the subject matter of any of Examples 14-23, wherein, the second material is omitted from at least one of a first end portion and a second end portion.

BRIEF DESCRIPTION OF THE DRAWINGS

FIG. 6 is a chart showing adhesion between example polymer materials used in embodiments of an insulated nanofiber collection in accordance with the present disclosure.

Figure 1:
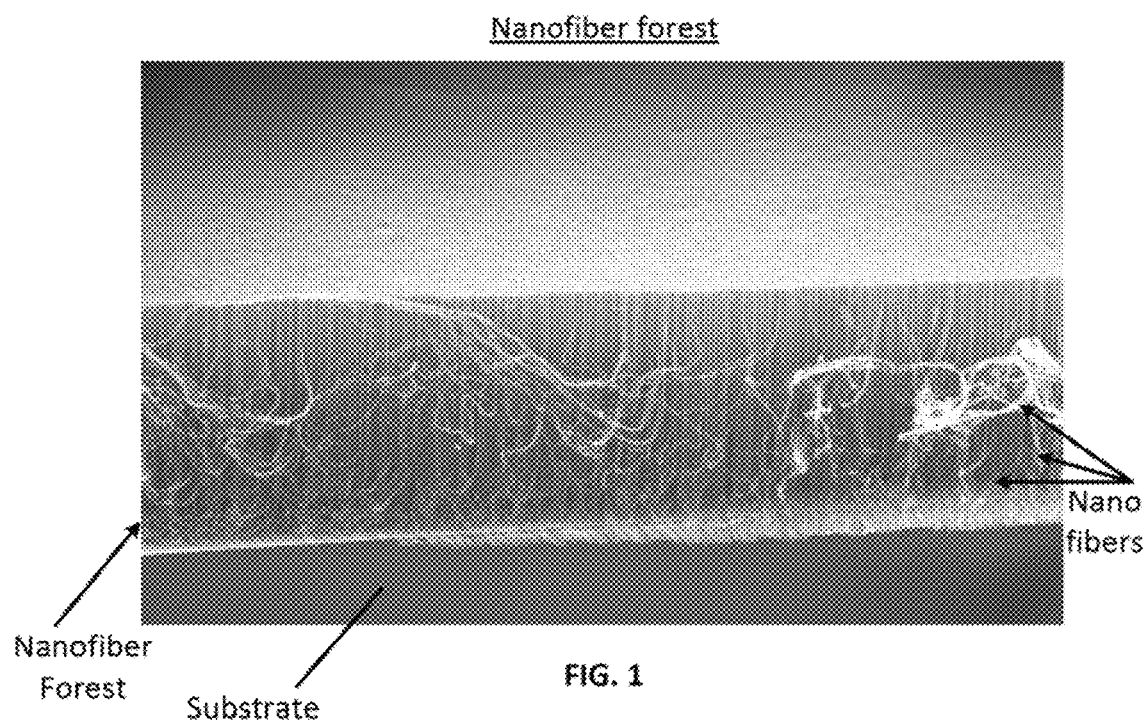
FIG. 1 illustrates an example forest of nanofibers on a substrate, in an embodiment.

The figures depict various embodiments of the present disclosure for purposes of illustration only. Numerous variations, configurations, and other embodiments will be apparent from the following detailed discussion.

DETAILED DESCRIPTION

Overview

When drawn into a sheet, collected into a strand of aligned nanofibers, or twisted into a yarn, carbon nanofibers have many advantageous electrical, optical, chemical and mechanical properties that lend themselves to applications in a variety of technological fields. The individual nanofibers within a sheet, strand, and/or yarn define gaps therebetween. Other materials, including but not limited to polymers, conductive nanoparticles, conductive microparticles, and combinations thereof, can be "infiltrated" into these gaps thereby forming a composite material with an even greater range of properties than those exhibited by carbon nanofibers alone.

However, in some cases, infiltrating a polymer into (and on) a nanofiber "collection" (e.g., a group of aligned nanofibers, such as a sheet, strand, or yarn) can decrease the electrical conductivity of the nanofiber collection. This can occur by one or both of two mechanisms. First, the polymer can insulate adjacent nanofibers from one another thereby interrupting intra-collection electrical pathways.

Second, the polymer can coat an exterior surface of the nanofiber collection, thereby increasing the electrical resistance (reducing or eliminating conductivity) between the nanofiber collection and a connected electrical contact. In other words, when the nanofibers themselves are electrically conductive (e.g., carbon nanofibers), an electrically resistive coating on an exterior of the infiltrated nanofiber yarn can impede the use of the nanofiber yarn in applications that require an electrical connection to other elements of a system. Because the outer layer of polymer is bonded to and integral with the polymer infiltrated within the interior of nanofiber yarn, it can difficult to remove only the outer layer. A cured outer layer may also have a strong affinity for the nanofiber surfaces. Removing the external surface layer by thermal or chemical methods can damage other portions of the infiltrated nanofiber yarn, including the nanofibers themselves. In turn, these events can degrade the electrical and/or mechanical properties of the nanofiber yarn. For these reasons, an insulating exterior layer disposed on an exterior surface of the nanofiber yarn makes it challenging to establish low resistance electrical connections to the infiltrated nanofiber yarn (e.g., connections having a resistance comparable to or less than that of electrical solders). As used herein, a nanofiber collection is internally conductive if it exhibits electrical resistivity of less than $1 \times 10^{-3}$ Ω-m within the collection. An interface between a nanofiber collection and an external electrical contact is said to be electrically conductive if it exhibits an electrical resistivity of less than $1 \times 10^{-6}$ Ω-m.

Another approach to insulating nanofibers is to use surface coating processes (whether on an infiltrated or non-infiltrated collection of nanofibers), similar to those used to produce insulated metallic (e.g., aluminum or copper) wire. For example, nanofiber yarns can be dipped into or drawn through a liquid or molten polymer, which is later cooled below its glass transition temperature or otherwise solidified by removing a solvent. This approach, however, has also been problematic because some polymers tend to infiltrate the porous nanofiber yarn structure to form a composite rather than a distinct insulation layer. This can cause nanofibers within a yarn (or other collection) to be insulated from one another, as described above. To avoid infiltration, in some cases, polymers with a wetting angle (on a nanofiber sheet) of greater than ninety degrees can be used to provide an insulating surface or near-surface coating on nanofiber wires that does not reduce the internal conductivity of the yarn. A disadvantage of this technique is that only specific coating materials can be used. Since nanofiber (including carbon nanofiber) collections can be infiltrated by a wide array of different polymers, this technique may exclude many polymers from use with carbon nanofiber collections.

Thus, in accordance with an embodiment of the present disclosure, improved techniques are described for making an insulated nanofiber collection. In some cases, the term "nanofiber yarn" will be used interchangeably with nanofiber collection. It will be appreciated that the use of the term "yarn" is for convenience and is not intended to limit the scope of the possible configurations of nanofiber collections contemplated herein. In one embodiment, the method includes infiltrating a nanofiber collection with a first material, removing excess amounts of the first material from the collection surface so that the outer surface of the nanofiber collection is free of the first material. An outer layer of an insulating second material can be placed over the infiltrated nanofiber collection to form an insulated, infiltrated nanofiber collection. An advantage of embodiments of the present disclosure is the ability to strip the insulating outer layer of polymer material from the insulated nanofiber collection, leaving an exposed conductive nanofiber fiber surface for making electrical connections. Electrical connections can be established, for example, by mechanically connecting an electrode or other electrical contact (e.g., a conductive clamp or fitting) directly to the exposed surface of the nanofiber collection or soldering an electrical conductor (e.g., a copper or aluminum wire) to the exposed surface of the nanofiber collection. Being able to strip portions of the outer layer of insulating polymer material to reveal an exterior surface of a conductive nanofiber collection increases the number of electrical and wiring applications in which nanofibers can be used. Another advantage of embodiments discussed in the present disclosure is the ability to use a greater variety of materials for the outer insulating layer. In addition to uses as electrical connectors, another use of strippable collection of the present disclosure is a sterile nanofiber collection with a strippable, protective layer for use in a biological environment. The outer layer can be removed to expose a sterile nanofiber yarn (or other nanofiber collection, e.g., a nanofiber sheet, a nanofiber strand).

A description of nanofiber forests and production techniques for nanofiber yarns precedes a description of techniques for making an insulated nanofiber yarn.

Nanofiber Forests

As used herein, the term "nanofiber" means a fiber having a diameter less than 1 µm. In some embodiments, nanofibers have a diameter less than 500 nm or less than 100 nm. While the embodiments herein are primarily described as fabricated from carbon nanotubes, it will be appreciated that embodiments of the present disclosure may be applied to other carbon allotropes, whether graphene, micron or nano-scale graphite fibers and/or plates, and even other compositions of nano-scale fibers such as boron nitride may be densified using the techniques described below.

As used herein, the terms "nanofiber" and "carbon nanotube" encompass both single-walled carbon nanotubes and/or multi-walled carbon nanotubes in which carbon atoms are linked together to form a cylindrical structure. In some embodiments, carbon nanotubes as referenced herein have between four and ten walls. As used herein, a "nanofiber sheet" or simply "sheet" refers to a sheet of nanofibers aligned via a drawing process (as described in PCT Publication No. WO 2007/015710, and incorporated by reference herein in its entirety) so that a longitudinal axis of a nanofiber of the sheet is parallel to a major surface of the sheet, rather than perpendicular to the major surface of the sheet (i.e., in the as-deposited form of the sheet, often referred to as a "forest"). This is illustrated and shown in FIGS. 3 and 4, respectively.

The dimensions of carbon nanotubes can vary greatly depending on production methods used. For example, the diameter of a carbon nanotube may be from 0.4 nm to 100 nm and its length may range from 10 µm to greater than 55.5 cm. Carbon nanotubes are also capable of having very high aspect ratios (ratio of length to diameter) with some aspect ratios as high as 132,000,000:1 or more. Given the wide range of dimensional possibilities, the properties of carbon nanotubes are highly adjustable, or "tunable." While many intriguing properties of carbon nanotubes have been identified, harnessing the properties of carbon nanotubes in practical applications requires scalable and controllable production methods that allow the features of the carbon nanotubes to be maintained or enhanced.

Due to their unique structure, carbon nanotubes possess particular mechanical, electrical, chemical, thermal and optical properties that make them well-suited for certain applications. In particular, carbon nanotubes exhibit superior electrical conductivity, high mechanical strength, good thermal stability and are also hydrophobic. In addition to these properties, carbon nanotubes may also exhibit useful optical properties. For example, carbon nanotubes may be used in light-emitting diodes (LEDs) and photo-detectors to emit or detect light at narrowly selected wavelengths. Carbon nanotubes may also prove useful for photon transport and/or phonon transport.

In accordance with various embodiments of the present disclosure, nanofibers (including but not limited to carbon nanotubes) can be arranged in various configurations, including in a configuration referred to herein as a "forest." As used herein, a "forest" of nanofibers or carbon nanotubes refers to an array of nanofibers having approximately equivalent dimensions that are arranged substantially parallel to one another on a substrate. FIG. 1 shows an example forest of nanofibers on a substrate. The substrate may be any shape but in some embodiments the substrate has a planar surface on which the forest is assembled. As can be seen in FIG. 1, the nanofibers in the forest may be approximately equal in height and/or diameter.

Some embodiments of nanofiber forests include nanofibers that have two portions in their as-deposited form. For example, one portion is a "straight portion" that terminates in an "open end" that connects to, and is disposed near, a growth substrate. The other portion is "an arcuate portion" (also sometimes referred to as a "tangled end") that is disposed at an exposed surface of the nanofiber layer and that bends away from a longitudinal axis of the straight portion.

Nanofiber forests as disclosed herein may be relatively dense. Specifically, the disclosed nanofiber forests may have a density of at least 1 billion nanofibers/cm$^2$. In some specific embodiments, a nanofiber forest as described herein may have a density of between 10 billion/cm$^2$ and 30 billion/cm$^2$. In other examples, the nanofiber forest as described herein may have a density in the range of 90 billion nanofibers/cm$^2$. The forest may include areas of high density or low density and specific areas may be void of nanofibers. The nanofibers within a forest may also exhibit inter-fiber connectivity. For example, neighboring nanofibers within a nanofiber forest may be attracted to one another by van der Waals forces. Regardless, a density of nanofibers within a forest can be increased by applying techniques described herein.

Methods of fabricating a nanofiber forest are described in, for example, PCT No. WO2007/015710, which is incorporated herein by reference in its entirety.

Figure 2:
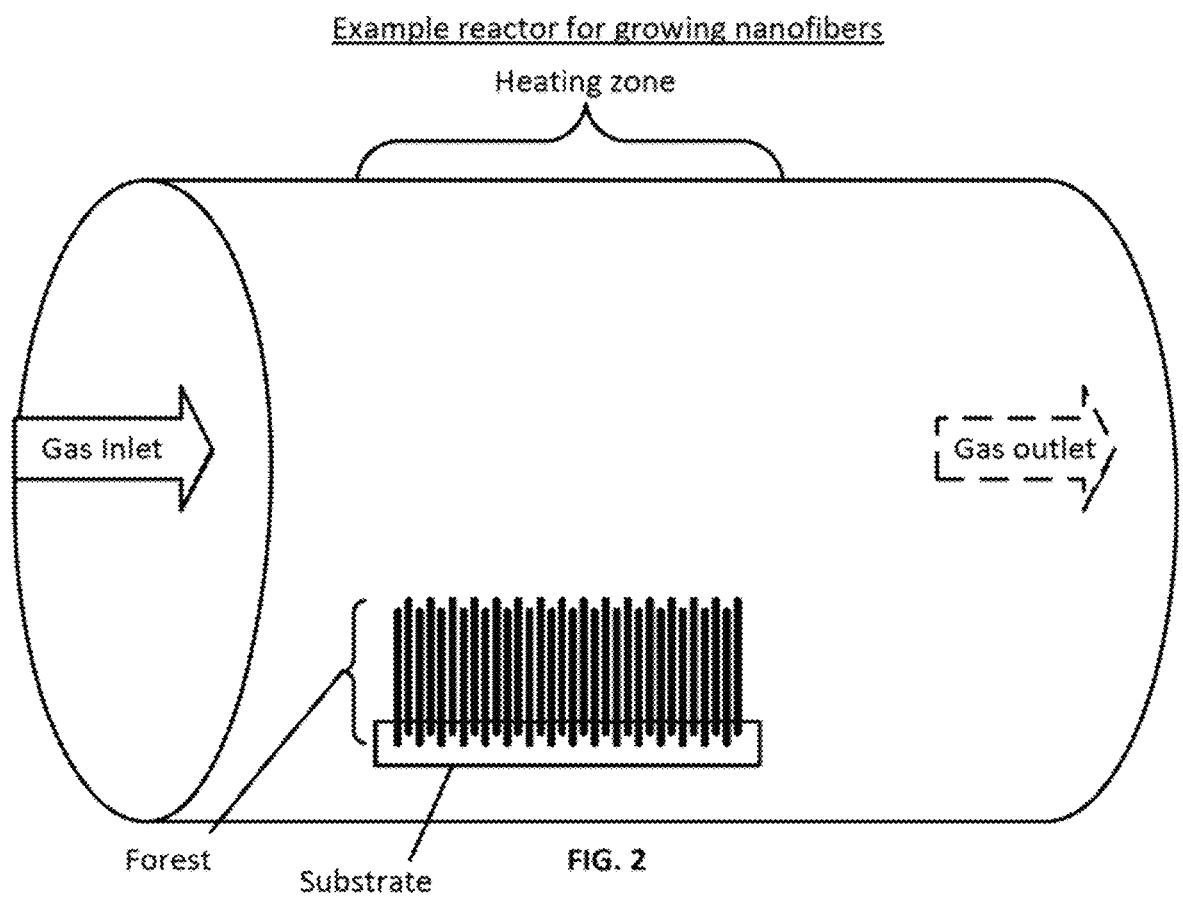
FIG. 2 is a schematic diagram of a reactor used for growing nanofibers, in an embodiment.

Various methods can be used to produce nanofiber precursor forests. For example, in some embodiments nanofibers may be grown in a high-temperature furnace, schematically illustrated in FIG. 2. In some embodiments, catalyst may be deposited on a substrate, placed in a reactor and then may be exposed to a fuel compound that is supplied to the reactor. Substrates can withstand temperatures of greater than 800° C. or even 1000° C. and may be inert materials. The substrate may comprise stainless steel or aluminum disposed on an underlying silicon (Si) wafer, although other ceramic substrates may be used in place of the Si wafer (e.g., alumina, zirconia, $SiO_2$, glass ceramics). In examples where the nanofibers of the precursor forest are carbon nanotubes, carbon-based compounds, such as acetylene may be used as fuel compounds. After being introduced to the reactor, the fuel compound(s) may then begin to accumulate on the catalyst and may assemble by growing upward from the substrate to form a forest of nanofibers. The reactor also may include a gas inlet where fuel compound(s) and carrier gasses may be supplied to the reactor and a gas outlet where expended fuel compounds and carrier gases may be released from the reactor. Examples of carrier gases include hydrogen, argon, and helium. These gases, in particular hydrogen, may also be introduced to the reactor to facilitate growth of the nanofiber forest. Additionally, dopants to be incorporated in the nanofibers may be added to the gas stream.

The reaction conditions during nanofiber growth can be altered to adjust the properties of the resulting nanofiber precursor forest. For example, particle size of the catalyst, reaction temperature, gas flow rate and/or the reaction time can be adjusted as needed to produce a nanofiber forest having the desired specifications. In some embodiments, the position of catalyst on the substrate is controlled to form a nanofiber forest having desired patterning. For example, in some embodiments catalyst is deposited on the substrate in a pattern and the resulting forest grown from the patterned catalyst is similarly patterned. Example catalysts include iron with a, buffer layer of silicon oxide ($SiO_2$) or aluminum oxide ($Al_2O_3$). These may be deposited on the substrate using chemical vapor deposition (CVD), pressure assisted chemical vapor deposition (PCVD), electron beam (eBeam) deposition, sputtering, atomic layer deposition (ALD), plasma enhanced chemical vapor deposition (PECVD), among others.

In some particular embodiments, multiple nanofiber precursor forests may be sequentially grown on the same substrate to form a multilayered nanofiber forest, alternatively referred to as a "stack."

In a process used to fabricate a multilayered nanofiber forest, one nanofiber forest is formed on a substrate followed by the growth of a second nanofiber forest in contact with the first nanofiber forest. Multi-layered nanofiber forests can be formed by numerous suitable methods, such as by forming a first nanofiber forest on the substrate, depositing catalyst on the first nanofiber forest and then introducing additional fuel compound to the reactor to encourage growth of a second nanofiber forest from the catalyst positioned on the first nanofiber forest. Depending on the growth methodology applied, the type of catalyst, and the location of the catalyst, the second nanofiber layer may either grow on top of the first nanofiber layer or, after refreshing the catalyst, for example with hydrogen gas, grow directly on the substrate thus growing under the first nanofiber layer. Regardless, the second nanofiber forest can be aligned approximately end-to-end with the nanofibers of the first nanofiber forest although there is a readily detectable interface between the first and second forest. Multi-layered nanofiber forests may include any number of forests. For example, a multi-layered precursor forest may include two, three, four, five or more forests.

Nanofiber Sheets

Figure 3:
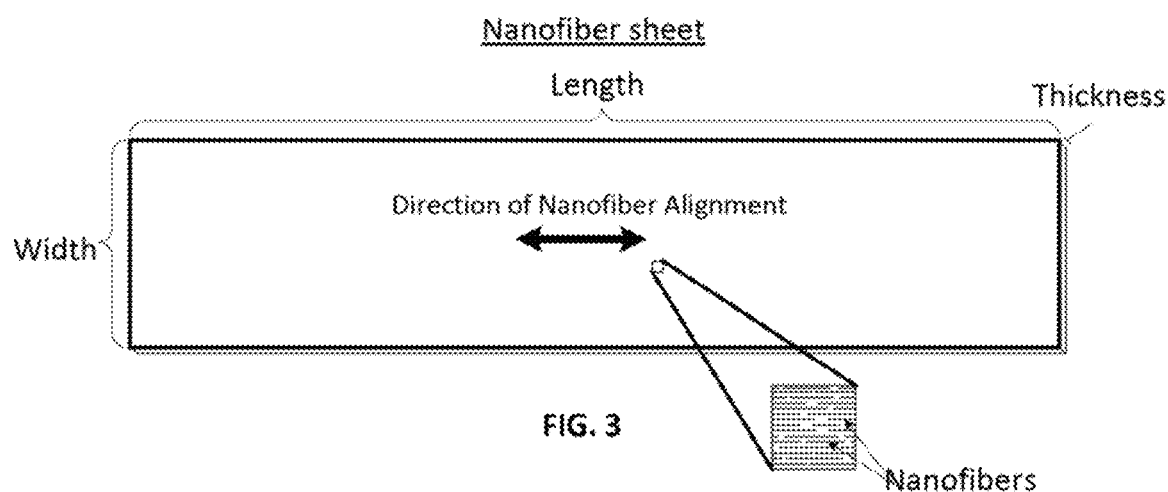
FIG. 3 is an illustration of a nanofiber sheet that identifies relative dimensions of the sheet and schematically illustrates nanofibers within the sheet aligned end-to-end in a plane parallel to a surface of the sheet, in an embodiment.

In addition to arrangement in a forest configuration, the nanofibers of the subject application may also be arranged in a sheet configuration. As used herein, the term "nanofiber sheet," "nanotube sheet," or simply "sheet" refers to an arrangement of nanofibers where the nanofibers are aligned end to end in a plane. An illustration of an example nanofiber sheet is shown in FIG. 3 with labels of the dimensions. In some embodiments, the sheet has a length and/or width that is more than 100 times greater than the thickness of the sheet. In some embodiments, the length, width or both, are more than $10^3$, $10^6$ or $10^9$ times greater than the average thickness of the sheet. A nanofiber sheet can have a thickness of, for example, between approximately 5 nm and 30 μm and any length and width that are suitable for the intended application. In some embodiments, a nanofiber sheet may have a length of between 1 cm and 10 meters and a width between 1 cm and 1 meter. These lengths are provided merely for illustration. The length and width of a nanofiber sheet are constrained by the configuration of the manufacturing equipment and not by the physical or chemical properties of any of the nanotubes, forest, or nanofiber sheet. For example, continuous processes can produce sheets of any length. These sheets can be wound onto a roll as they are produced.

As can be seen in FIG. 3, the axis in which the nanofibers are aligned end-to end is referred to as the direction of nanofiber alignment. In some embodiments, the direction of nanofiber alignment may be continuous throughout an entire nanofiber sheet. Nanofibers are not necessarily perfectly parallel to each other and it is understood that the direction of nanofiber alignment is an average or general measure of the direction of alignment of the nanofibers.

Nanofiber sheets may be assembled using any type of suitable process capable of producing the sheet. In some example embodiments, nanofiber sheets may be drawn from a nanofiber forest. An example of a nanofiber sheet being drawn from a nanofiber forest is shown in FIG. 4

Figure 4:
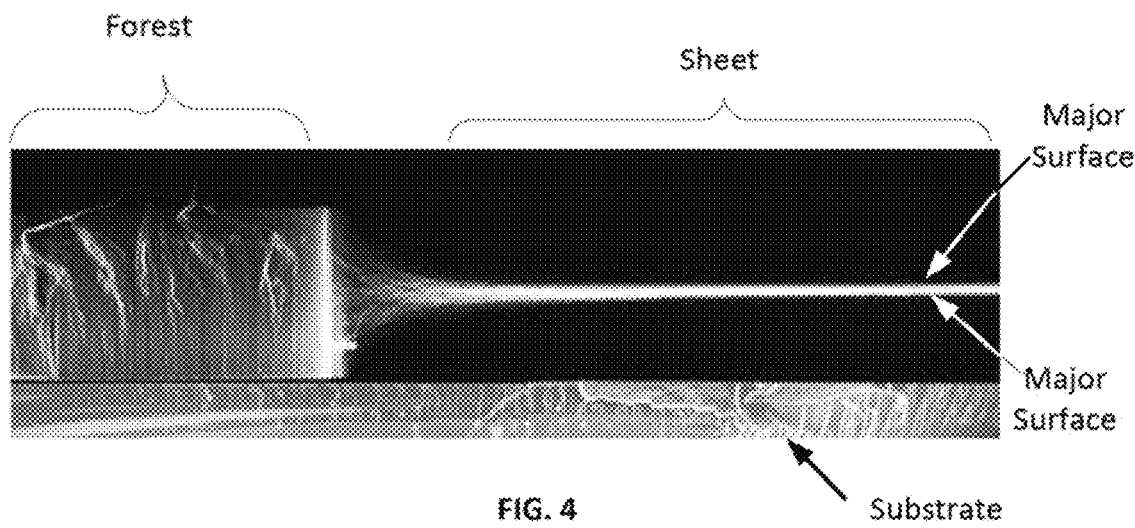
FIG. 4 is an image of a nanofiber sheet being laterally drawn from a nanofiber forest, the nanofibers aligning from end-to-end as schematically shown in FIG. 3.

As can be seen in FIG. 4, the nanofibers may be drawn laterally from the forest and then align end-to-end to form a nanofiber sheet. In embodiments where a nanofiber sheet is drawn from a nanofiber forest, the dimensions of the forest may be controlled to form a nanofiber sheet having particular dimensions. For example, the width of the nanofiber sheet may be approximately equal to the width of the nanofiber forest from which the sheet was drawn. Additionally, the length of the sheet can be controlled, for example, by concluding the draw process when the desired sheet length has been achieved.

Nanofiber sheets have many properties that can be exploited for various applications. For example, nanofiber sheets may have tunable opacity, high mechanical strength and flexibility, thermal and electrical conductivity, and may also exhibit hydrophobicity. Given the high degree of alignment of the nanofibers within a sheet, a nanofiber sheet may be extremely thin. In some examples, a nanofiber sheet is on the order of approximately 10 nm thick (as measured within normal measurement tolerances), rendering it nearly two-dimensional. In other examples, the thickness of a nanofiber sheet can be as high as 200 nm or 300 nm. As such, nanofiber sheets may add minimal additional thickness to a component.

As with nanofiber forests, the nanofibers in a nanofibers sheet may be functionalized by a treatment agent by adding chemical groups or elements to a surface of the nanofibers of the sheet and that provide a different chemical activity than the nanofibers alone. Functionalization of a nanofiber sheet can be performed on previously functionalized nanofibers or can be performed on previously unfunctionalized nanofibers. Functionalization can be performed using any of the techniques described herein including, but not limited to CVD, and various doping techniques.

Nanofiber sheets, as drawn from a nanofiber forest, may also have high purity, wherein more than 90%, more than 95% or more than 99% of the weight percent of the nanofiber sheet is attributable to nanofibers, in some instances. Similarly, the nanofiber sheet may comprise more than 90%, more than 95%, more than 99% or more than 99.9% by weight of carbon.

Nanofiber Collections

Examples discussed herein relate to nanofiber yarns. However, it is contemplated that the embodiments discussed in the present disclosure apply generally to nanofiber collections, including sheets, untwisted strands, threads, ribbons, yarns, wires, ropes, cables, plies, woven three-dimensional articles, and other nanofiber structures. Nanofiber yarns can be made from nanofiber forests using a solid-state drawing and spinning process. For example, a conventional synthetic fiber spinning method may be used to produce nanofiber collections from a nanofiber forest, such as melt spinning, electrospinning, dry spinning, wet spinning, or other technique known in the art. Spinning techniques and methods of making nanofiber collections are discussed in U.S. patent application Ser. No. 15/844,756, which is incorporated herein by reference in its entirety.

Similar to nanofiber sheets discussed above, nanofibers may be drawn laterally from the forest, causing the nanofibers to align end-to-end and form a continuous nanofiber yarn. In embodiments where a nanofiber yarn is drawn from a nanofiber forest, the dimensions of the forest may be controlled to form a continuous nanofiber yarn having specific dimensions. In one example, a nanofiber yarn is drawn and stretched in a uniaxial direction along the longitudinal axis/length of the yarn. Drawing treatment reduces fiber diameter and improves fiber uniformity and alignment of the nanotubes within the yarn. In some embodiments, the nanofiber yarn is drawn in a hot, dry air environment and without the addition of any additives applied to the nanofiber yarn. In other embodiments, drawing is undertaken in liquid or steam environment and additives are added to precursor fibers to improve the drawing performance. Other drawing and/or spinning techniques known in the art may be used to produce the nanofiber yarn or other nanofiber collection.

Although embodiments of the present disclosure are directed to conductive nanofiber yarns, such as carbon nanofiber yarns, the nanofiber yarn can comprise any suitable material. In some embodiments, the continuous nanofiber yarn can comprise a polymer, copolymer, petroleum pitch, lignin, graphene, cellulose, a sol from inorganic materials, or combinations of these materials. The nanofiber yarn optionally may include an additive, such as organic/inorganic salts, surfactants, organic compounds, macromolecules, copolymers, nanoparticles, nanotube/fibers, nano platelets, nanowires, and quantum dots. Nanofiber yarns optionally can be subjected to further treatment to form carbon nanofiber yarns. In other embodiments, the continuous nanofiber yarn may comprise one or more precursor nanofibers of silicon carbide, carbon, inorganic oxides, carbon composites, metal/carbon composites, or inorganic oxide/carbon composite materials.

Examples of metals suitable for preparing metal/carbon composite nanofiber yarns include platinum, silver, gold, copper, and titanium. Examples of inorganic oxide nanomaterials suitable for preparing inorganic oxide/carbon composite nanofiber yarns include silica, iron oxide, aluminum oxide, titanium dioxide, manganese oxide, zinc oxide, cobalt oxide, nickel oxide, vanadium oxide, chromium oxide, niobium oxide, zirconium dioxide, rubidium oxide, rhodium oxide, and mixtures thereof.

As with nanofiber forests, the nanofibers in a nanofiber yarn may be functionalized by adding chemical groups or elements to a surface of the nanofibers of the yarn. The chemical groups may provide a different chemical activity than the nanofibers alone. Functionalization of a nanofiber yarn can be performed on previously functionalized nanofibers or can be performed on previously unfunctionalized nanofibers. Functionalization can be performed using any of the techniques described herein including, but not limited to CVD, and various doping techniques.

Nanofiber yarns drawn from a nanofiber forest may have high purity, where more than 90%, more than 95% or more than 99% of the weight percent of the nanofiber yarn is attributable to nanofibers. Similarly, the nanofiber yarn may comprise more than 90%, more than 95%, more than 99% or more than 99.9% by weight of carbon. The yarns may be essentially free of elements other than carbon. A yarn is essentially free of an element if the element is absent or only detectable in amounts due to impurities or contamination.

Nanofiber yarns may exhibit a twist, false twist, braid, weave, or fold. For the purposes of the present disclosure, a false twist means a twist in one direction that is followed by an approximately equal twist in the opposite direction, resulting in a net twist of about zero.

Insulated Nanofiber Collections

For convenience of explanation, the following examples are primarily focused on nanofiber yarns. Embodiments of nanofibers, whether yarns, yarn bundles, plied yarn, forests, untwisted strands, twisted, false-twisted, densified, or not densified, will be referred to generically as "collections" or "structures" of nanofibers. It will be appreciated that other nanofiber collections can be used in place of the nanofiber yarn described below.

Figure 5:
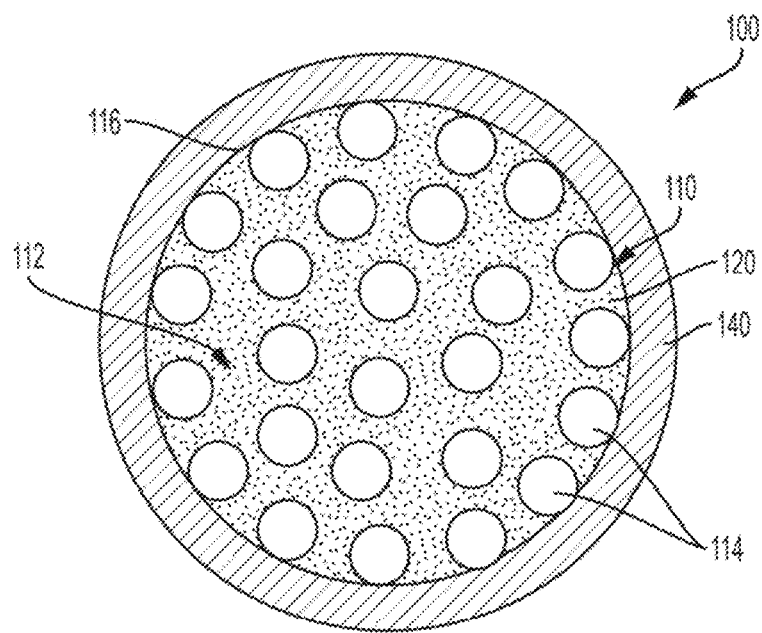
FIG. 5 illustrates a cross-sectional view of an insulated nanofiber collection showing a first material disposed within a portion of the nanofiber collection and a second material coating the nanofiber collection in accordance with an embodiment of the present disclosure.

FIG. 5 illustrates a cross-sectional diagram showing an example of an insulated conductor 100 according to an embodiment of the present disclosure. The insulated conductor 100 includes a nanofiber collection 110 with an interior portion 112 and an outside surface 116 (indicated by a circle encompassing the collection 110), a first material 120, and a second material 140. It will be appreciated that the size of objects and thicknesses of layers illustrated in FIG. 5 are exaggerated for convenience of explanation. Insulated conductor 100 includes a nanofiber collection 110 extending along a longitudinal axis (described in the context of FIG. 8). A first material 120 is disposed in an inside portion 112 of nanofiber collection 110 without coating an outside surface 116 of nanofiber collection 110, therefore leaving outside surface 116 exposed for making electrical connections. A second material 140 is disposed as a coating over outside surface 116 of nanofiber collection 110 and first material 120.

In some embodiments, nanofiber collection 110 can be a nanofiber yarn or other assembly of nanofibers 114 discussed above. In some embodiments, nanofiber collection 110 is electrically conductive, such as a carbon nanofiber yarn (in some examples infiltrated with conductive nano- or -micro-particles). In examples, nanofiber collection 110 has a resistivity p no greater than $1\times10^{-3}$ Ω-m, no greater than $1\times10^{-5}$ Ω-m or no greater than $1\times10^{-6}$ Ω-m. As a collection of porous nanotube fibers, nanofiber collection 110 generally has a porous structure and porous outside surface 116. In some embodiments, nanofiber collection 110 can have a diameter below 50 µm, below 40 µm, below 30 µm, below 20 µm or below 10 µm. In one example, nanofiber collection 110 is a nanofiber yarn with a false twist along its length and a diameter from 10 µm to 20 µm, from 20 µm to 30 µm, from 30 µm to 40 µm, or from 40 µm to 50 µm. In one specific example, nanofiber collection 110 is a carbon nanofiber yarn having a diameter of approximately 28 µm (within natural process variation measurement error of +/−5 µm). Other larger or smaller diameters/thicknesses are acceptable. Yarns may also be untwisted or exhibit a true twist, as described in U.S. patent application Ser. No. 15/844,756.

First material 120 is disposed in or infiltrated into voids between nanofibers 114 of nanofiber collection 110 and/or into voids within individual nanofibers 112. In some embodiments, outside surface 116 is substantially free of first material 120 to enable making direct electrical connections to nanofiber collection 110. Outside surface 116 is substantially free of first material 120 when outside surface 116 lacks a continuous coating of first material 120 and is free of first material 120 to the extent that direct electrical contacts can be made with nanofiber collection 110 and have a resistance comparable to or below that of electrical solders. Thus, in some cases, relatively small isolated areas of first material 120 may exist on outside surface 116.

In some embodiments, first material 120 is a polymer. In other embodiments, first material 120 is a metal. In yet other embodiments, first material 120 is an electrically-conductive polymer or a polymer containing metal or other electrically-conductive particles. As discussed in more detail below, first material 120 can infiltrate nanofiber collection 110 in a liquid state (e.g., a molten polymer or polymer-solvent solution) and then can be cured to or otherwise allowed to assume a solid or gel state (e.g., by cooling below the glass transition temperature or evaporation of a solvent).

Second material 140 can be disposed on or disposed over an outside surface 116 of nanofiber collection 110 as an electrically insulating coating. For example, second material 140 can be applied as a liquid coating (e.g., a molten polymer or a polymer-solvent solution) and then cured or otherwise allowed to solidify and form a solid, but flexible, insulating outer layer. In another example, a length of shrink tubing can be reduced to conform to nanofiber collection 110. In other examples, other insulating materials may be installed on nanofiber collection 110. In examples, second material 140 is selected to have a resistivity of at least $1\times10^{12}$ Ω-m, at least $1\times10^{13}$ Ω-m, at least $1\times10^{14}$ Ω-m, or at least $1\times10^{15}$ Ω-m. In examples, second material 140 has a thickness sufficient to provide an electrical resistance of at least $1\times10^{7}$ Ω, at least $1\times10^{9}$Ω, or at least $1\times10^{12}$Ω. FIG. 5 shows second material 140 as having a significant thickness compared to nanofiber collection 110. In this example, it will be appreciated that FIG. 5 is not drawn to scale and that some dimensions have been exaggerated for convenience of illustration. In examples, second material 140 can have a thickness that negligibly affects the diameter or thickness of nanofiber collection 110. In some embodiments, second material 140 has a thickness from 10 µm to 1 mm, including 20 µm, 50 µm, 100 µm, 200 µm, 500 µm, 750 µm, and values in between these values. In other embodiments, second material has a thickness greater than 1 mm or less than 10 µm.

In some embodiments, second material 140 contains particles that facilitate release or separation from first material 120. For example, second material 140 is a polymer containing particles of silica, glass beads, and/or polytetrafluoroethylene (PTFE). Further, second material 140 can be selected to have a coefficient of thermal expansion that is different from that of first material 120. Accordingly, heating or cooling may be employed to facilitate release of second material 140 from infiltrated nanofiber collection 110.

In some embodiments, insulated conductor 100 is configured so that portions of second material 140 can be stripped away similar to conventional techniques used for stripping insulated copper wire. In some embodiments, first material 120 and second material 140 are selected so that first material 120 does not chemically react with or bond to second material 140. Additionally, first material 120 and second material 140 can be selected to exhibit no better than fair adhesion or poor adhesion (such as having an adhesion value relative to one another of below $10^5$ Pa). For example, first material 120 has a first surface free energy $\gamma_1$ that is lower than a second surface free energy $\gamma_2$ of second material 140. In some embodiments, the value of surface free energy γ is equal to or below 20 mJ/m² as consistent with poor adhesion. In other embodiments, the value of surface energy γ is below a threshold value of 40 mJ/m², below 35 mJ/m², below 30 mJ/m², below 25 mJ/m², or below 20 mJ/m². For the example of polymers being used for the first material 120 and the second material 140, the two polymers would have low miscibility with one another (based on molecular weight and Flory interaction parameter χ). Since adhesion between two materials depends on many factors, such as wetting angle θ (measured on a carbon nanofiber sheet), coefficient of friction, surface roughness, immiscibility, and mechanical forces, more than one factor may be considered when selecting first material 120 and second material 140. Generally, as wetting angle θ increases, adhesion decreases. Accordingly, fair or poor adhesion is obtained in some embodiments when a wetting angle or contact angle θ is greater than 90° for second material 140 in a liquid state on first material 120 in a solid state, or for second material 140 in a liquid state on middle layer 160 in a solid state. In other embodiments, the contact angle θ is greater than 120°, greater than 135°, or greater than 150°. In one embodiment, the contact angle θ is than 137°. Other values for contact angle θ are acceptable.

First material 120 and second material 140 may also or alternately be selected based on a coefficient of static friction µ between them. In some embodiments, the coefficient of static friction µ is no greater than 0.5, no greater than 0.1, or no greater than 0.05. Other values for the coefficient of static friction µ are acceptable. In other embodiments, adhesion between first material 120 and second material 140 less than $10^5$ Pa.

Figure 6:
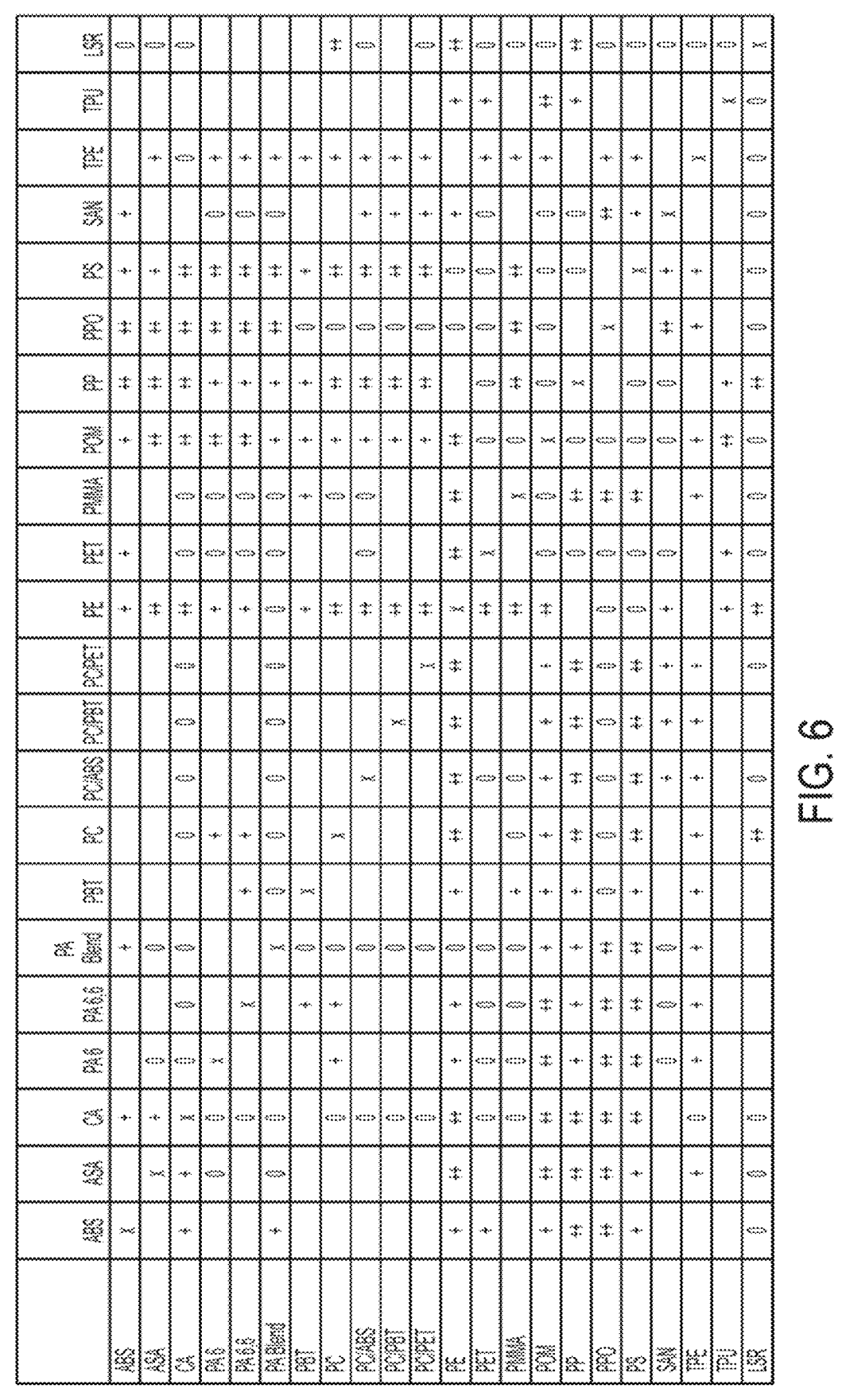

Referring now to FIG. 6, a grid shows adhesion between example combinations of first material 120 and second material 140. Preferred combinations of first material 120 and second material 140 exhibit fair or poor adhesion when placed in contact with each other in a solid state. Grid locations marked with "+" exhibit fair adhesion and represent an example of a preferred combination; grid locations marked with "++" exhibit poor adhesion and represent an example of a more preferred combination. Blank locations in the grid exhibit good or better adhesion and therefore are preferred in embodiments only where good adhesion between the two materials is desired. Grid locations marked with a "0" have no adhesion data available and remain potentially acceptable combinations of first material and second material. Grid locations marked with an "X" represent adhesion when first material 120 is the same as second material 140, which generally is a disfavored combination since the adhesion between layers of the same material is typically excellent.

FIG. 6 includes the following abbreviations for the common name of the material in parentheses: ABS (acrylonitrile-butadiene-styrene), ASA (acrylate-styrene-acrylonitrile), CA (cellulose acetate), PA 6 (polyamide 6, a.k.a. nylon 6), PA 6,6 (polyamide 6,6, a.k.a. nylon 66), PA blend (polyamide blend), PBT (polybutylene terephthalate), PC (polycarbonate), PC/ABS (polycarbonate/acrylonitrile-butadiene-styrene mixture), PC/PBT (polycarbonate/polybutylene terephthalate mixture), PC/PET (polycarbonate/polyethylene terephthalate mixture), PE (polyethylene), PET (polyethylene terephthalate), PMMA (polymethyl methacrylate), POM (polyoxymethylene), PP (polypropylene), PPO (polyphenylene oxide), PS (polystyrene), SAN (styrene acrylonitrile copolymer), TPE (thermoplastic elastomer), TPU (thermoplastic polyurethane), and LSR (liquid silicone rubber). First material 120 and second material 140 are not limited to these materials.

In addition to or as an alternative to selecting first material 120 and second material 140 with fair or poor adhesion, some embodiments of nanofiber collection 110 can be configured to facilitate stripping of second material 140 by providing outside surface 116 with a specified roughness or coefficient of friction or peel strength or by selecting the first material 120 and the second material 140 to be immiscible with one another.

Figure 7:
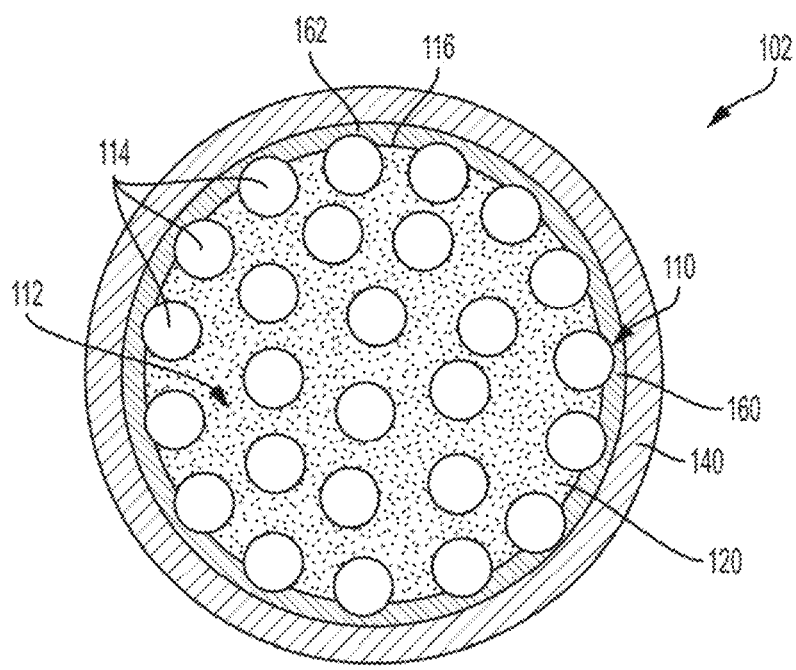
FIG. 7 illustrates a cross-sectional view of another embodiment of an insulated nanofiber collection showing a first material infiltrating a portion of a nanofiber collection, a middle layer disposed on the outside surface of the infiltrated nanofiber collection, and a second material disposed on the middle layer.

One technique for achieving the desired adhesion with second material 140 or desired surface characteristics of infiltrated nanofiber collection 100 is to apply a middle layer 160 to the infiltrated nanofiber collection 100 so that it is between the first material 120 and the second material 140. This is shown in FIG. 7, which is a cross-sectional view of another insulated nanofiber collection 102.

As shown, outside surface 116 includes nanofibers 114 and also may include an outer surface of first material 120. Middle layer 160 can be a polymer, a metal, or some other conductive or non-conductive material or combinations of these materials. For example, middle layer 160 can be a polymer coating with low surface roughness and/or fair or poor adhesion to second material 140 to facilitate removal of second material 140. In one embodiment, middle layer 160 is a third material with poor or fair adhesion to second material 140 and good or excellent adhesion to first material 120. In some embodiments, middle layer 160 exhibits a self-leveling effect due to the material properties, due to application techniques, or both. For example, middle layer 160 can fill valleys and uneven regions on outside surface 116 of nanofiber collection 110 and can provide a middle layer outer surface 162 that is more even (i.e., a surface roughness of less than 10 µm) than nanofiber collection 110. Accordingly, second material 140 is disposed on a middle layer outside surface 162. In some examples, the middle layer is compositionally different from the second material or from both the first material and the second material.

Example System and Method

Figure 8:
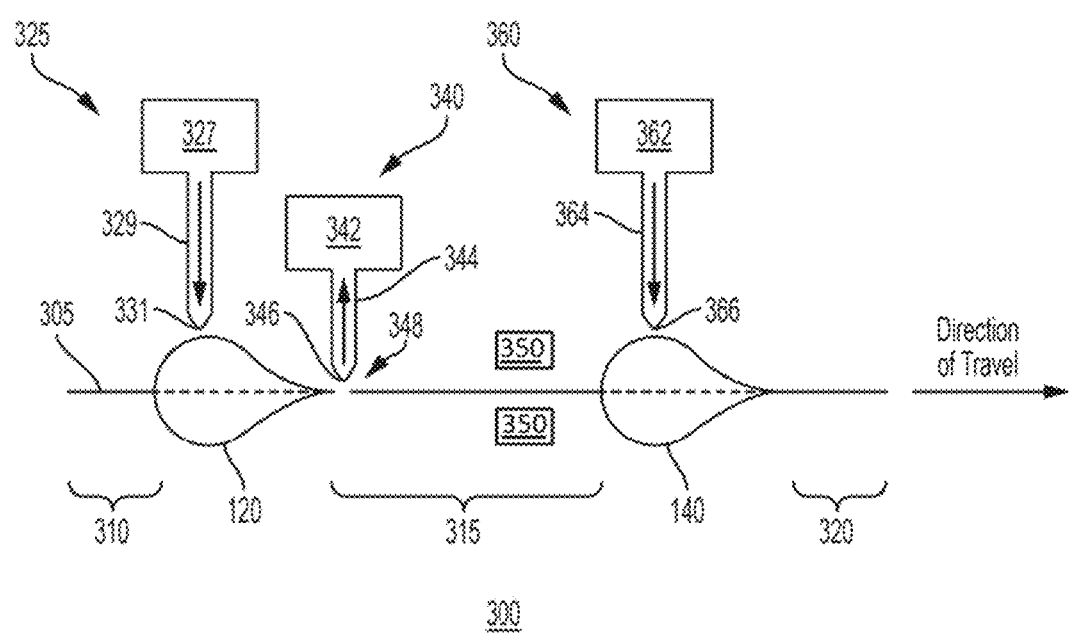
FIG. 8 is a schematic diagram showing a system for making an insulated nanofiber collection in accordance with an embodiment of the present disclosure.
Figure 9:
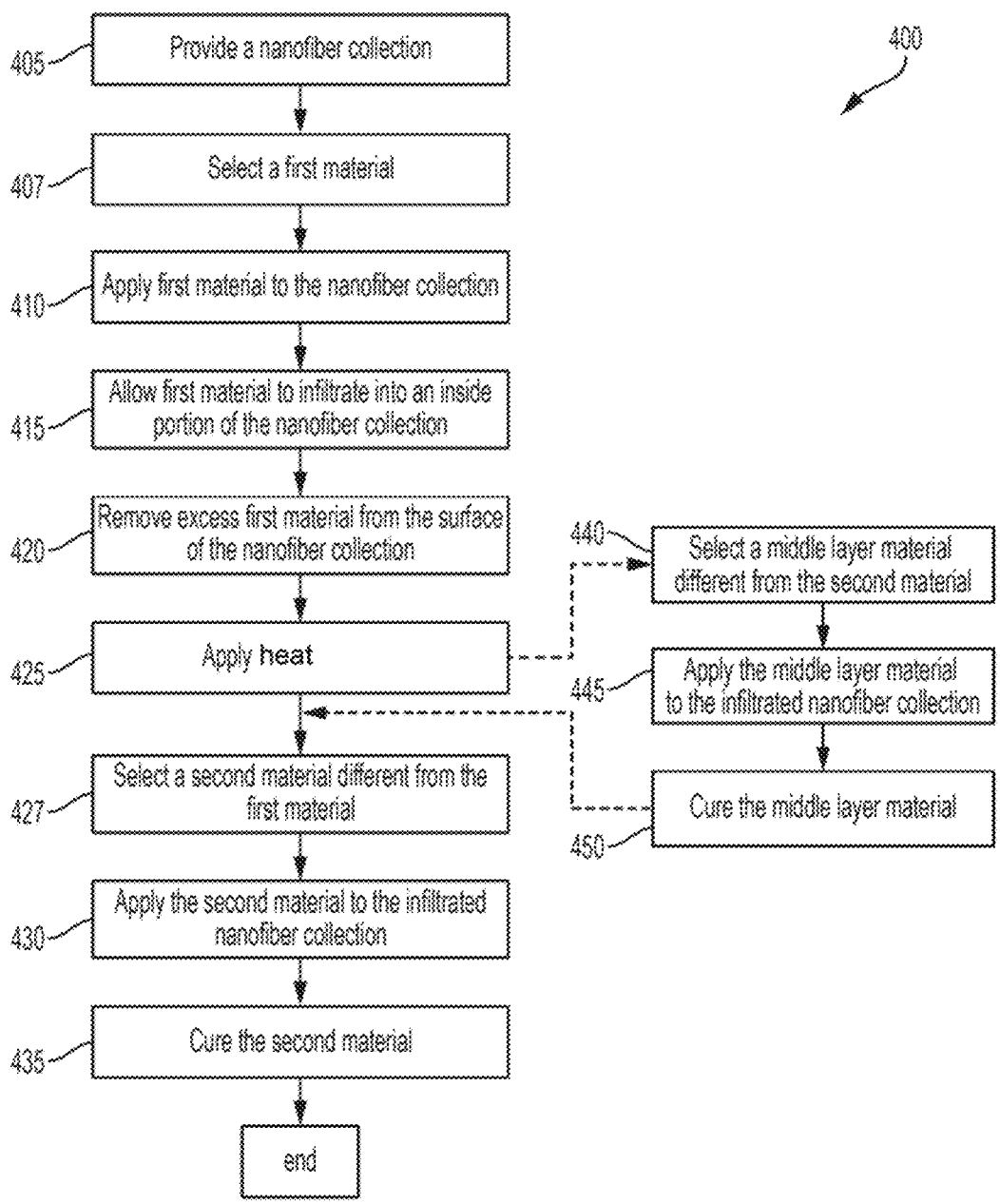
FIG. 9 is a flow chart illustrating exemplary steps in a method of making an insulated nanofiber collection in accordance with embodiments of the present disclosure.

Referring now to FIGS. 8 and 9, FIG. 8 schematically illustrates a system 300 for fabricating insulated nanofiber collections, as described above. FIG. 9 is a method flow chart that illustrates a method 400 of making an insulated nanofiber collection (e.g., an insulated conductor) in accordance with an embodiment of the present disclosure.

FIG. 8 illustrates the system 300 for insulating a nanofiber yarn 305 or other nanofiber collection 110. Nanofiber yarn 305 extends along a longitudinal axis colinear with the nanofiber yarn 305 and parallel to the direction of travel indicated in FIG. 8. The nanofiber yarn 305 is shown in FIG. 8 at various stages of processing. Other elements used for spinning nanofibers into a nanofiber yarn 305, optionally densifying a nanofiber yarn, guiding the nanofiber yarn throughout the system 300, and winding the processed nanofiber yarn, such as those described in U.S. patent application Ser. No. 15/844,756 are omitted for clarity of explanation.

In some embodiments, all or part of system 300 operates on a continuous or semi-continuous basis. For example, system 300 is used to produce insulated conductors 100 with a packaged length on the order of traditional insulated copper wires (e.g., 100 meters). In some embodiments, method 400 is performed as a continuous or semi-continuous operation, as a batch operation, or combinations of continuous and batch operations.

System 300 includes a first material applicator 325, a vacuum station 340, a curing station 350, and a second material applicator 360. Additional material applicators, curing stations, and other equipment (not shown) may be added consistent with techniques described herein. For example, an additional material applicator is added after curing station 350 to apply optional middle layer 160 or other surface treatments.

The method 400 begins by providing 405 a nanofiber collection, such as a nanofiber yarn 305 to the system 300. In an example, nanofiber collection can be provided 405 by drawing nanofibers from a nanofiber forest and spinning the nanofibers into a nanofiber yarn 305. It will be appreciated that other types of nanofiber collections can be supplied to the system 300. A first section 310 of nanofiber yarn 305 is an untreated, or "native," portion of the nanofiber yarn 305. First section 310 includes outside surface 116 that is exposed to the atmosphere in the processing environment. In some embodiments, nanofiber collection 110 has a resistivity ρ no greater than $1 \times 10^{-3}$ Ω-m or no greater than $1 \times 10^{-6}$ Ω-m at room temperature.

A first material 120 is selected 407. Examples of the first material 120 include those that can infiltrate the untreated first section 310 of the nanofiber collection 305. Example of "infiltration materials" include molten polymers such as thermoplastics (e.g. polyethylene, polypropylene), epoxides in a pre-cured, viscoelastic state, polymer/solvent solutions (e.g., polyethylene in toluene), solvent solutions that include at least one of a polymer, colloidal particles and/or nanoparticles in suspension (e.g., polyethylene in toluene with silver nanoparticles). In some examples, first material 120 not only infiltrates gaps between (and defined by) individual nanofibers 114 disposed within an inside portion 112 of the nanofiber yarn 305, but also can cause the individual nanofibers 114 to draw closer together. This "densification" can improve various properties of the nanofiber yarn 305, including increasing tensile strength and electrical conductivity, among other properties. In one embodiment, first material 120 is selected based on preferred polymer combinations shown in the table of FIG. 6 with "+" or "++" indicating fair or poor adhesion.

The nanofiber yarn 305, and more specifically portion 310 of the nanofiber yarn 305, passes proximate to a first material applicator 325 where first material 120 is applied 410 to nanofiber yarn 305. In one embodiment of system 300, the first material applicator 325 includes a reservoir 327 and a channel 329. First material 120 flows through channel 329 onto the nanofiber yarn 305 as the nanofiber yarn 305 is drawn past a dispensing opening 331 defined in one end of the channel 329. In one embodiment, nanofiber yarn 305 is pulled through first material 120 in a liquid state as it is dispensed from first material applicator 325. Other application methods for first material 120 are acceptable, including vapor deposition, spray coating, and dip coating.

In some examples, first material applicator 325 includes a controller (not shown) that controls a rate at which first material 120 is applied to the nanofiber yarn 305 and/or an amount of first material 120 applied. Specific examples of controllers include mass flow controllers, peristaltic pumps, timing valves, among others. The rate and/or amount applied can be selected in coordination with a speed at which the nanofiber yarn 305 passes by the dispensing opening 331 of the channel 329 and a desired thickness of the first material 120 to be formed on the exposed surface of the nanofiber yarn 305. In other examples, the channel 329 includes a valve that opens and closes to control the amount, periodicity, and/or dispensing rate of first material 120.

Once dispensed, first material 120 infiltrates 415 into an inside portion 112 of nanofiber yarn 305. After depositing first material 120, second section 315 of the nanofiber yarn 305 has first material 120 infiltrated into inside portion 112 of the nanofiber yarn 305 and between the nanofibers 114 (shown in FIGS. 5 and 7) that form nanofiber yarn 305.

Excess first material 120 is removed 420 from an outside surface 116 of nanofiber yarn 305. In one embodiment, removal 420 is performed by applying vacuum suction proximate to nanofiber yarn 305 via vacuum station 340 while first material 120 is in a liquid or flowable state. For example, vacuum station 340 includes a vacuum source 342 and a conduit 344 that is used to apply the vacuum to the location proximate to the liquid surface coating of first material 120 prior to cure or solidification of the first material 120. The result of removing excess first material 120 is that outside surface 116 is substantially free of the first material 120, thereby enabling direct electrical contacts to insulated conductor 100 with a resistance comparable to or less than that of solder connections, as described above.

It will be appreciated that other mechanisms can be used to remove the surface coating of excess first material 120. For example, an impingement mechanism can be used to scrape off the surface coating (e.g., a squeegee). In another example, a stream or focused bursts of fluid (e.g., compressed air, solvent) can be used to remove the liquid surface coating of first material 120. In another example, first material 120 on outside surface 116 is evaporated or removed by heating. In yet another example, first material 120 is removed from outside surface 116 by laser ablation. Other types of removal methods will be appreciated in light of this disclosure.

The applied vacuum removes 420 a portion of the first material 120 on the outside surface 116 of the nanofiber yarn 305 while also leaving at least a portion of first material 120 disposed within the gaps between nanofibers 114 in an inside portion 112 of the nanofiber yarn 305. The vacuum pressure to accomplish removal is determined in part by the magnitude of negative pressure and/or a volume per unit time of vacuum produced by the vacuum source 342, the size of a vacuum opening 346 defined by the conduit 344 that is proximate to the nanofiber yarn 305, and a distance 348 separating the nanofiber yarn 305 and vacuum opening 356. Furthermore, the vacuum pressure can be varied depending on the viscosity of first material 120. More vacuum pressure can be applied if first material 120 has a high viscosity. Examples of situations in which a higher vacuum pressure is applied include a molten polymer approaching its glass transition temperature, a polymer/solvent solution in which the solvent content is sufficient to swell but not solvate the polymer, and an epoxy in which the epoxide reaction has progressed relative to formation of the surface coating.

Optionally, heat can be applied 425 by curing station 350 to cure first material 120 (or accelerate evaporation of a solvent) prior to depositing the second material 140. Temperature applied 425 by the curing station 350 and duration of the applied 425 heat are determined at least in part by the material chosen for first material 120. In some embodiments, the applied 425 heat causes first material 120 to flow into inside portion 112 (shown in FIGS. 5 and 7), thereby exposing at least a portion of the outside surface 116 so that electrical contact can be made. In some embodiments, heat can be applied by radiant heat (e.g., a heating element in the curing station 350), inductive heating through applied electromagnetic fields (emitted by the curing station 350) or by joule heating by applying current directly to the nanofiber yarn.

A second material 140 can be selected 427. In some embodiments, second material 140 is compositionally different than first material 120 (e.g., formulated from different chemical groups, different elements, or different structural arrangements of chemical groups and elements used in the first material). Examples of second material 140 include molten polymers such as thermoplastics (e.g. polyethylene, polypropylene), epoxides in a pre-cured, viscoelastic state, polymer/solvent solutions (e.g., polyethylene in toluene), polymer/solvent solutions that include colloidal particles or nanoparticles in suspension (e.g., polyethylene in toluene with silver nanoparticles). In some examples, second material is selected to provide an electrically insulating outer coating over nanofiber yarn 305. For example, second material 140 is selected to have a resistivity of at least $1 \times 10^{16}$ Ω-m. In one embodiment, second material is selected based on preferred polymer combinations shown in the table of FIG. 6 with "+" or "++" indicating fair or poor adhesion, respectively.

An outer coating of second material 140 is applied 430 to or deposited on nanofiber yarn 305 that has been infiltrated 415 with first material 120. Application 430 of the second material 140 occurs by passing the nanofiber yarn 305 infiltrated with first material 120 proximate to a second material applicator 360 where second material 140 is applied. In one embodiment of system 300, second material applicator 360 includes a reservoir 362 and a channel 364. Second material 140 flows through channel 364 onto the infiltrated nanofiber yarn 305 as the nanofiber yarn 305 is drawn past a second dispensing opening 366 defined by one end of the channel 364. In one embodiment, nanofiber yarn 305 is pulled through second material 140 in a liquid state as it is dispensed from second material applicator 360. Other application methods for second material 140 are acceptable, including vapor deposition, spray coating, and dip coating.

After applying 430 the second material 140, FIG. 8 illustrates a third section 320 of nanofiber yarn 305 infiltrated by the first material 120 and coated with the second material 140. Second material 140 is applied to nanofiber yarn 305 to provide an insulating coating over outside surface 116. Similar to application of first material 120, second material 140 may be applied by pulling nanofiber yarn 305 through second material 140 in a liquid state. Coating of nanofiber yarn 305 can also be done by spray-coating, electro-static spray coating, vapor deposition, dip-coating, applying a shrink tubing, or application methods known in the art.

The second material 140 can be cured 435 or otherwise solidified (e.g., by removal of a solvent, cooling below a glass transition temperature).

Optionally, a middle layer 160 can be selected 440 and applied 445 (by a dispenser similar to 325 and 360, but not shown) to the nanofiber yarn 305. After first material 120 is cured, the middle layer material 160 is selected 440, where in some cases the middle material is different from second material 140. In some embodiments, the middle layer material 160 is the same as first material 120. In any event, middle layer material may not strongly adhere or chemically bond to second material 140. In some embodiments, middle layer 160 is a solid, a gel, a liquid, or a powder that facilitates separation of second material 140 from first material 120. For example, middle layer 160 is a volatile lubricant that facilitates removal of second material 140 and evaporates after removal of second material 140 to leave an exposed nanofiber yarn 305. The middle layer 160 may then be optionally cured 450 or otherwise solidified.

Embodiments in accordance with the present disclosure provide an insulated electrical conductor with the benefits of a nanofiber yarn or other nanofiber collection as well as the ability to strip the insulating outer layer (second material 140) using traditional methods.

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. An insulated nanofiber conductor comprising:
    a continuous nanofiber collection including an assembly of nanofibers oriented so as to extend along a longitudinal axis of the insulated nanofiber conductor and having an outside surface and an inside portion;
    a first material infiltrated into the inside portion of the nanofiber collection, wherein the outside surface of the nanofiber collection is substantially free of the first material and the first material is electrically conductive;
    a second material coating the outside surface of the nanofiber collection, wherein the second material is electrically insulating; and
    a middle layer disposed on the outside surface of the nanofiber collection between the electrically conductive first material and the electrically insulating second material, wherein
    the middle layer comprises a material that is compositionally different from the electrically insulating second material and the first material, and
    an adhesion between the middle layer and the electrically insulating second material is weaker than an adhesion between the middle layer and the first material.

2. The insulated nanofiber conductor of claim 1, wherein the nanofiber collection is electrically conductive.

3. The insulated nanofiber conductor of claim 2, wherein the nanofiber collection is a carbon nanofiber yarn.

4. The insulated nanofiber conductor of claim 1, wherein the nanofiber collection has a diameter less than 50 μm.

5. The insulated nanofiber conductor of claim 1, wherein the second material is omitted from at least one of a first end portion and a second end portion of the insulated nanofiber conductor.

6. The insulated nanofiber conductor of claim 1, wherein an outer surface of the middle layer, which interfaces with the electrically insulating second material, has a surface roughness of less than 10 μm.

* * * * *